Patented Feb. 16, 1932

1,845,633

UNITED STATES PATENT OFFICE

NORBERT SPECHT, OF ORANIENBURG, NEAR BERLIN, GERMANY, ASSIGNOR, BY MESNE ASSIGNMENTS, TO KREBS PIGMENT AND COLOR CORPORATION, OF NEWARK, NEW JERSEY, A CORPORATION OF DELAWARE

PROCESS FOR THE PURIFICATION OF IMPURE DIOXIDE OF TITANIUM CONTAINING IN PARTICULAR CHROMIUM

No Drawing. Application filed April 6, 1929, Serial No. 353,260, and in Germany April 14, 1928.

In decomposing hydrolytically solutions of titanium for the purpose of precipitating dioxide of titanium therefrom, the latter will carry along from said solutions any impurities present. These impurities are detrimental to titanium dioxide, as soon as they will impair the pure white colour of the dioxide of titanium. While it is relatively simple to maintain such conditions as will permit the precipitation of dioxide of titanium which is as free from ferric oxide as possible, dioxide of titanium possesses in respect of other coloured oxides, which are present in small quantities, such an absorbent property, and on the other hand these coloured oxides cause such a strong colouring of the dioxide of titanium, that only a very unsatisfactory dioxide of titanium is obtained in the presence of such coloured oxides. Besides vanadium, copper and manganese, chromium is just that oxide which will most injuriously affect the colouring of the dioxide of titanium.

In order to purify for instance such dioxide of titanium containing chromium, the said dioxide of titanium is mixed with a small quantity of alkali, alkali metal carbonate or the like, or some dioxide of titanium still containing some acid is mixed with an excess of alkali, alkali metal carbonate, oxide of magnesium, oxide of barium and so on and the previously dried mixture is subjected to incandescent heat.

It is possible to accelerate the resulting process of oxidation of the oxide of chromium to chromate by adding thereto oxidation agents. The roasted product is then ground and washed in order to free it of alkali and chromate of alkali and other soluble salts that may be present. The last residue of alkali which may adhere to the dioxide of titanium may be neutralized and rendered harmless subsequently through the addition of acids of other neutralizing salts, as for instance, sulphate of aluminium, sulphate of zinc and the like. Finally the oxide of titanium thus purified is dried and if desired it can be mixed with other white pigments. While in the appended claims I have referred specifically to a slight excess of alkali, I desire it to be understood that instead of alkali I may use as an equivalent the carbonate of an alkali metal, or magnesium oxide or barium oxide, and I desire the claims to be interpreted as covering such equivalents. When I speak of a slight excess of said substances, I mean an excess sufficient to insure that the mass, after being subjected to incandescent heat and after all of the chromium compounds present have reacted with the alkali to form soluble chromium compounds, will still exhibit a weakly alkaline reaction.

I claim:

1. A process for purifying impure titanium dioxide containing chromium, which comprises mixing the said titanium dioxide with a compound chosen from the group consisting of alkaline compounds of the alkali metals, and oxides of the alkaline earth metals, in slight excess over that required to react with all of the chromium present, subjecting this mixture to incandescent heat, grinding the resulting mass, and washing the ground mass to remove soluble compounds.

2. A process for the purification of impure titanium dioxide containing chromium, which comprises mixing said titanium dioxide with an alkali metal hydroxide in slight excess over that required to react with all of the chromium present, subjecting this mixture to incandescent heat, grinding the resulting mass, and washing the ground mass to remove soluble compounds.

3. A process for the purification of impure titanium dioxide containing chromium, which comprises mixing said titanium dioxide with an alkali metal carbonate in slight excess over that required to react with all of the chromium present, subjecting this mixture to incandescent heat, grinding the resulting mass, and washing the ground mass to remove soluble compounds.

4. A process for the purification of impure titanium dioxide containing chromium, which comprises mixing said titanium dioxide with an alkaline earth hydroxide in slight excess over that required to react with all of the chromium present, subjecting this mixture to incandescent heat, grinding the resulting mass, and washing the ground mass to remove soluble compounds.

5. In a process for the purification of impure titanium dioxide containing chromium, the step which comprises mixing said titanium dioxide with a compound chosen from the group consisting of alkaline compounds of the alkali metals, and oxides of the alkaline earth metals, in slight excess over that required to react with all of the chromium present, and subjecting this mixture to incandescent heat.

6. In a process for the purification of impure titanium dioxide containing chromium, the step which comprises mixing said titanium dioxide with an alkali metal hydroxide in slight excess over that required to react with all of the chromium present, and subjecting this mixture to incandescent heat.

7. In a process for the purification of impure titanium dioxide containing chromium, the step which comprises mixing said titanium dioxide with an alkali metal carbonate in slight excess over that required to react with all of the chromium present, and subjecting this mixture to incandescent heat.

8. In a process for the purification of impure titanium dioxide containing chromium, the step which comprises mixing said titanium dioxide with an alkaline earth hydroxide in slight excess over that required to react with all of the chromium present, and subjecting this mixture to incandescent heat.

In testimony whereof I affix my signature.

NORBERT SPECHT.